United States Patent
Ai et al.

(10) Patent No.: US 8,520,955 B2
(45) Date of Patent: Aug. 27, 2013

(54) OBJECT DETECTION APPARATUS AND METHOD

(75) Inventors: Haizhou Ai, Beijing (CN); Chang Huang, Beijing (CN); Shihong Lao, Kyoto (JP); Takayoshi Yamashita, Kizugawa (JP)

(73) Assignees: Tsinghua University, Beijing (CN); Omron Corporation, Kyoto (JP)

( * ) Notice: Subject to any disclaimer, the term of this patent is extended or adjusted under 35 U.S.C. 154(b) by 500 days.

(21) Appl. No.: 12/810,449

(22) PCT Filed: Dec. 24, 2008

(86) PCT No.: PCT/CN2008/073699
§ 371 (c)(1),
(2), (4) Date: Sep. 23, 2010

(87) PCT Pub. No.: WO2009/089720
PCT Pub. Date: Jul. 23, 2009

(65) Prior Publication Data
US 2011/0007974 A1   Jan. 13, 2011

(30) Foreign Application Priority Data
Dec. 28, 2007   (CN) .................. 2007 1 03054997

(51) Int. Cl.
*G06K 9/46*    (2006.01)
(52) U.S. Cl.
USPC ........................................... 382/201
(58) Field of Classification Search
USPC ....................... 382/181, 201, 231
See application file for complete search history.

(56) References Cited

U.S. PATENT DOCUMENTS

| | | | | |
|---|---|---|---|---|
| 5,915,038 A | * | 6/1999 | Abdel-Mottaleb et al. | ... 382/209 |
| 7,272,242 B2 | * | 9/2007 | Nevis et al. | ... 382/103 |
| 2002/0102024 A1 | * | 8/2002 | Jones et al. | ... 382/225 |
| 2006/0245618 A1 | * | 11/2006 | Boregowda et al. | ... 382/107 |
| 2007/0086660 A1 | | 4/2007 | Ai et al. | |
| 2007/0147684 A1 | * | 6/2007 | Loce et al. | ... 382/199 |
| 2008/0089588 A1 | * | 4/2008 | Nagahashi | ... 382/190 |
| 2008/0285849 A1 | * | 11/2008 | Lu et al. | ... 382/166 |

FOREIGN PATENT DOCUMENTS

| | | |
|---|---|---|
| CN | 1900973 A | 1/2007 |
| CN | 1996344 A | 7/2007 |
| JP | 2000-217115 A | 8/2000 |
| JP | 2004-246618 A | 9/2004 |
| JP | 2007-58722 A | 3/2007 |
| JP | 2007-109229 A | 4/2007 |

* cited by examiner

*Primary Examiner* — Edward Park
(74) *Attorney, Agent, or Firm* — Dickstein Shapiro LLP

(57) ABSTRACT

The present invention discloses an object detection apparatus and method. A feature extracting section of the present invention comprises: a feature point extracting section, for extracting a combination of predetermined feature point pairs from an image; a pixel value obtaining section, for obtaining a pixel value of each feature point in the combination of feature point pairs; a feature point comparing section, for comparing, in accordance with the pixel values obtained by the pixel value obtaining section, two feature points in each feature point pair to obtain a logical value; and an feature obtaining section, for determining the feature of the image in accordance with the logical value.

12 Claims, 12 Drawing Sheets

1. CALCULATING DIFFERENCE IN BRIGHTNESS BETWEEN ■ and □ (thrice)
2. TOTALLING DIFFERENCE IN BRIGHTNESS (ONCE)
3. CORRECTING DIFFERENCE IN BRIGHTNESS (ONCE)

1. CALCULATING DIFFERENCE IN BRIGHTNESS BETWEEN ■ and □ (thrice)

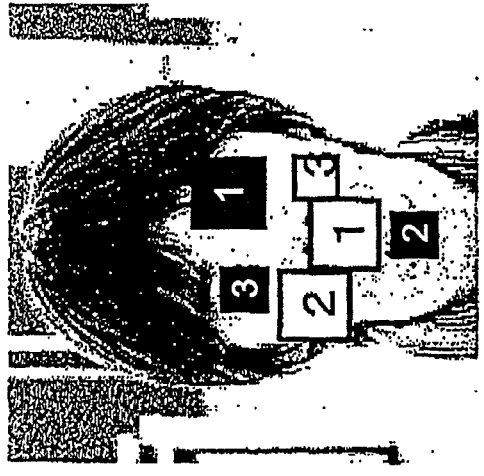
1. CALCULATING DIFFERENCE IN BRIGHTNESS BETWEEN ■ and □ (thrice)
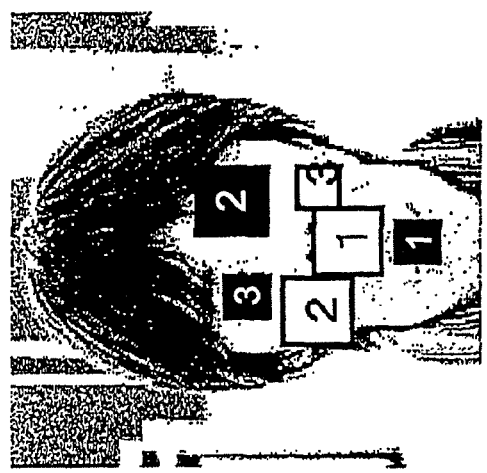
1. CALCULATING DIFFERENCE IN BRIGHTNESS BETWEEN ■ and □ (thrice)
2. TOTALLING DIFFERENCE IN BRIGHTNESS (ONCE)
3. CORRECTING DIFFERENCE IN BRIGHTNESS (ONCE)
FIG 4

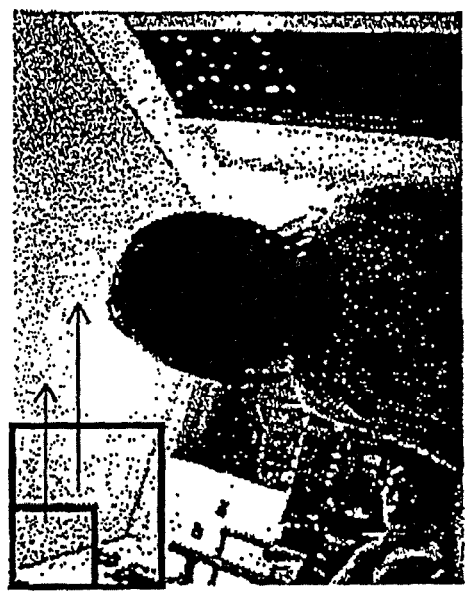
FIG 5

| CLASSIFIER INFORMATION | NUMBER OF LAYERS | 15 | | |
| --- | --- | --- | --- | --- |
| | LAYER INFORMATION | SERIAL NUMBER OF LAYER | 1 | |
| | | CLASSIFIER TABLE | 10 | |
| | | THRESHOLD VALUE | 1.5 | |
| | | WEAK CLASSIFIER INFORMATION | SERIAL NUMBER OF CLASSIFIER | 1 |
| | | | WEIGHT | 1.0 |
| | | | NUMBER OF REFERENCE POSITIONS | 4 |
| | | | REFERENCE POSITION 1 | x=0,y=0 |
| | | | REFERENCE POSITION 2 | x=1,y=2 |
| | | | REFERENCE POSITION 3 | x=3,y=4 |
| | | | REFERENCE POSITION 4 | x=5,y=6 |
| | | | RELIABILITY TABLE | 1, 2, 3, 4, 5, 6, 7 |
| | | | SERIAL NUMBER OF CLASSIFIER | 2 |
| | | | ... | |
| | | ... | | |
| | ... | | | |

FIG 7

OBJECT DETECTION APPARATUS AND METHOD

FIELD OF THE INVENTION

The present invention relates to an object detection apparatus and an object detection method.

BACKGROUND OF THE RELATED ART

Currently, more and more attention is paid to object detection, a representative of which is face detection. Face detection is the use of specific strategies on a randomly given image to search to see whether there is a human face contained therein: if yes, the position, size and countenance of the human face are returned. The human face is usually extremely rich in biometric information applicable in such fields as man-machine interaction, tracking and monitoring, and identification recognition etc., while the primary step in extracting information relevant to the human face is to position the region of the human face. This brings about an unusual significance to the technology of face detection and opens up a wide range for application. The practicality of face detection depends largely upon the enhancement of detection precision and detection speed.

There include in the hierarchical structure of a conventional detector, from an descending order, the detector, strong classifiers, weak classifiers, feature extraction and function mapping. In other words, the conventional detector comprises a plurality of strong classifiers, each of which comprises a plurality of weak classifiers, and each of which in turn comprises a feature extracting section and a mapping section. The feature extracting section extracts features, and the mapping section performs weak classification via methods like the one based on the look up table.

As presented in the following prior art documents, image brightness difference information (difference in values) is extracted during feature extraction in conventional face detection methods, the weak classifiers base thereon to judge whether the features constitute a face (also referred to as face exactness or weak classification), and the strong classifiers are prepared by combining these plural features.

PATENT DOCUMENT 1

US Patent Application Publication No. 2002/0102024

PATENT DOCUMENT 2

Japanese Patent Application Laid-open No. 2007-109229

NON-PATENT DOCUMENT 1

"*Robust Real-Time Face Detection*", Paul A. Viola, Michael Jones, International Journal of Computer Vision No. 572 Vol. 2, pp 137-154 (2004)

NON-PATENT DOCUMENT 2

"Face Detection in High Speed and All Directions", Yamashita, Lao et al., Symposium of Image Recognition/Comprehension (MIRU 2004) Vol. II, pp 271-276.

Brief explanations are made below to the prior art.

The Description of the US Patent Application Publication No. 2002/0102024 discloses an AdaBoost, which is a learning method for combining a plurality of weak classifiers having low recognition capacity to obtain strong classifiers with boosted judgment capability, and is an Ensemble Learning method.

In methods such as the AdaBoost, features suitable for recognition are selected from features prepared in advance to fabricate weak classifiers. In order to learn strong classifiers from as less weak classifiers as possible, the gist lies in preparing in advance features capable of boosting recognition capability.

In Japanese Patent Application laid-open No. 2007-109229, a tree structured detector is used to detect a various of face orientation, and each node of the tree structure is formed by a weak classifier utilizing a plurality of Haar features.

Since the Haar features are utilized in that invention, the feature is calculated through the intensity distribution of the difference in brightness between two normalized regions. Consequently, as addition, subtraction and division are employed in the calculation of each weak classifier, the computational cost is relatively high.

In "Robust Real-Time Face Detection" and "Face Detection in High Speed and All Directions", the characteristics of the face detection methods mostly rest in basing on the difference in brightness (difference in values) between two adjacent regions to calculate the feature. The difference in brightness varies with the variations in the brightness of the face. For instance, if the face is dark, the difference in brightness is small, whereas if the face is bright, the difference in brightness is great. There is hence a need to correct the difference in brightness according to the status of the brightness and darkness of the face.

It is necessary to calculate the average brightness of each region in order to calculate the difference in brightness between the two regions. An integrated image is used for high speed calculation in the non-patent documents 1 and 2.

High-speed calculation and correction under the status of the brightness and darkness are performed through the integrated image, but the memory requirement is relatively great insofar as the integrated image is concerned, and correction may also become the cause for time consumption in the calculation of the feature.

That is to say, as shown in FIG. 13, Haar features calculated under three types of human faces of different brightness should all be corrected to become the standard feature. In FIG. 13, the average brightness in the black frame is subtracted from the average brightness in the white frame to obtain the difference in brightness. The white frame indicates granules whose granular combination coefficient is positive, and the black frame indicates granules whose granular combination coefficient is negative.

As can be known from the above, the feature based on the difference in brightness (difference in values) of the face is utilized in conventional methods of face detection to judge the exactness of the face. The feature must be corrected regardless of the variations of the brightness of the face to calculate the standard feature, and it is time consuming in the calculation of the feature.

SUMMARY OF THE INVENTION

The present invention is proposed in view of the aforementioned deficiencies and restrictions existent in the prior art to provide an object detection apparatus and method, so as to remove one or more deficiencies of the prior art, and to provide at least one advantageous selection.

In order to achieve these objectives, the present application provides the following aspects.

Aspect 1, an object detection apparatus for detecting a predetermined object from an image, comprising one or more strong classifiers each including one or more weak classifiers each including a feature extracting section and a function mapping section, of which the feature extracting section extracts an feature of the image, and the function mapping section determines a weak classification of the image in accordance with the feature extracted by the feature extracting section; characterized in that the feature extracting section comprises:

a feature point extracting section, for extracting a combination of predetermined feature point pairs from the image;

a pixel value obtaining section, for obtaining a pixel value of each feature point in the combination of feature point pairs;

a feature point comparing section, for comparing, in accordance with the pixel values obtained by the pixel value obtaining section, two feature points in each feature point pair to obtain a logical value; and an feature obtaining section, for determining the feature of the image in accordance with the logical value.

Aspect 2, the object detection apparatus according to aspect 1, characterized in that the pixel value is brightness.

Aspect 3, the object detection apparatus according to aspect 1, characterized in that the pixel value is intensity, angular degree, or gradient obtained by extraction of a boundary.

Aspect 4, the object detection apparatus according to any one of aspects 1 to 3, characterized in that the feature point comparing section directly compares the pixel values of two feature points in each feature point pair to obtain the logical value, in accordance with a magnitude relationship therebetween and in accordance with predetermined rules.

Aspect 5, the object detection apparatus according to any one of aspects 1 to 3, characterized in that the feature point comparing section accumulatively compares the pixel values of two feature points in each feature point pair to obtain the logical value, in accordance with a magnitude relationship therebetween and in accordance with predetermined rules.

Aspect 6, the object detection apparatus according to any one of aspects 1 to 3, characterized in that the feature point comparing section accumulatively compares in an expanding manner the pixel values of two feature points in each feature point pair to obtain the logical value, in accordance with a magnitude relationship therebetween and in accordance with predetermined rules.

Aspect 7, the object detection apparatus according to aspect 1, characterized in further comprising a front processing section for processing the image to generate the image suitable for calculation of the feature.

Aspect 8, the object detection apparatus according to aspect 1, characterized in comprising a search window determining section for determining a sub-window which is used for searching the object in the image, wherein the feature extracting section extracts the feature of the part of the image in the sub-window.

Aspect 9, the object detection apparatus according to aspect 1, characterized in comprising an image zooming section for zooming the image, wherein the feature extracting section extracts the feature of the zoomed image.

Aspect 10, the object detection apparatus according to aspect 1, characterized in that the feature point comprises a plurality of pixel points, wherein the pixel value obtaining section calculates an average pixel value of the plurality of pixel points as the pixel value of the feature point.

Aspect 11, the object detection apparatus according to aspect 1, characterized in that the feature point comprises a plurality of pixel points, and that the object detection apparatus comprises a shrunk image fabricating section for shrinking the image in accordance with the number of the pixel points included in the feature point, wherein the feature extracting section extracts the feature of the shrunk image.

Aspect 12, the object detection apparatus according to aspect 11, characterized in that the shrunk image fabricating section fabricates shrunk images having the same number as the number of a squared magnification, and the feature extracting section extracts the feature of the shrunk image of a proper position.

Aspect 13, the object detection apparatus according to aspect 1, characterized in comprising a plurality of strong classifiers configured as one of a cascade structure, a nested cascade structure and a tree structure.

Aspect 14, the object detection apparatus according to aspect 1, characterized in that the object is a human body, a specific animal, a vehicle or a human face.

Aspect 15, an object detection method, comprising one or more strongly classifying steps each including one or more weakly classifying steps each including a feature extracting step and a function mapping step, of which the feature extracting step extracts an feature of an image to be detected, and the function mapping step determines a weak classification of the image in accordance with the feature extracted by the feature extracting step; characterized in that the feature extracting step comprises:

a feature point extracting step, for extracting a combination of predetermined feature point pairs from the image;

a pixel value obtaining step, for obtaining a pixel value of each feature point in the combination of feature point pairs;

a feature point comparing step, for comparing, in accordance with the pixel values obtained by the pixel value obtaining step, two feature points in each feature point pair to obtain a logical value; and an feature obtaining step, for determining the feature of the image in accordance with the logical value.

Aspect 16, the object detection method according to aspect 15, characterized in that the pixel value is brightness.

Aspect 17, the object detection method according to aspect 15, characterized in that the pixel value is intensity, angular degree, or gradient obtained by extraction of a boundary.

Aspect 18, the object detection method according to any one of aspects 15 to 17, characterized in that the feature point comparing step directly compares the pixel values of two feature points in each feature point pair to obtain the logical value, in accordance with a magnitude relationship therebetween and in accordance with predetermined rules.

Aspect 19, the object detection method according to any one of aspects 15 to 17, characterized in that the feature point comparing step accumulatively compares the pixel values of two feature points in each feature point pair to obtain the logical value, in accordance with a magnitude relationship therebetween and in accordance with predetermined rules.

Aspect 20, the object detection method according to any one of aspects 15 to 17, characterized in that the feature point comparing step accumulatively compares in an expanding manner the pixel values of two feature points in each feature point pair to obtain the logical value, in accordance with a magnitude relationship therebetween and in accordance with predetermined rules.

Aspect 21, the object detection method according to aspect 15, characterized in further comprising a front processing step for processing the image to generate the image suitable for calculation of the feature.

Aspect 22, the object detection method according to aspect 15, characterized in comprising a search window determining step for determining sub-window which is used for searching the object in the image, wherein the feature extracting step extracts the feature of the part of the image in the sub-window.

Aspect 23, the object detection method according to aspect 15, characterized in comprising an image zooming step for zooming the image, wherein the feature extracting step extracts the feature of the zoomed image.

Aspect 24, the object detection method according to aspect 15, characterized in that the feature point comprises a plurality of pixel points, wherein the pixel value obtaining step calculates an average pixel value of the plurality of pixel points as the pixel value of the feature point.

Aspect 25, the object detection method according to aspect 15, characterized in that the feature point comprises a plurality of pixel points, and that the object detection method comprises a shrunk image fabricating step for shrinking the image in accordance with the number of the pixel points included in the feature point, wherein the feature extracting step extracts the feature of the shrunk image.

Aspect 26, the object detection method according to aspect 25, characterized in that the shrunk image fabricating step fabricates shrunk images having the same number as the number of a squared magnification, and the feature extracting step extracts the feature of the shrunk image of a proper position.

Aspect 27, the object detection method according to aspect 15, characterized in comprising a plurality of strongly classifying steps configured as one of a cascade structure, a nested cascade structure and a tree structure.

Aspect 28, the object detection method according to aspect 15, characterized in that the object is a human body, a specific animal, a vehicle or a human face.

The present invention can achieve the following technical effects:

since the feature can be calculated merely by means of the comparison result (logical value) of the magnitudes of the pixel values (such as the brightness), calculation of the feature can be achieved in very high speed;

since multiplication and division are not employed, hardware implementation is made easier.

BRIEF DESCRIPTION OF THE DRAWINGS

The accompanying drawings make up of part of the application and explain the principles of this invention together with the text portion of the Description. In the drawings, FIG. 1 schematically illustrates a structure employing the object detection apparatus according to the present invention;

FIG. 4 schematically shows a comparison between the number of calculation times of the prior art calculation method and the number of calculation times of the calculation method according to the present invention;

FIG. 5 shows determination of the search window;

FIG. 7 is a schematically view showing expressions of identifier formation recordation obtained via learning;

SPECIFIC EMBODIMENTS

Specific embodiments of this invention are explained in greater detail below with reference to the accompanying drawings.

Figure 1:
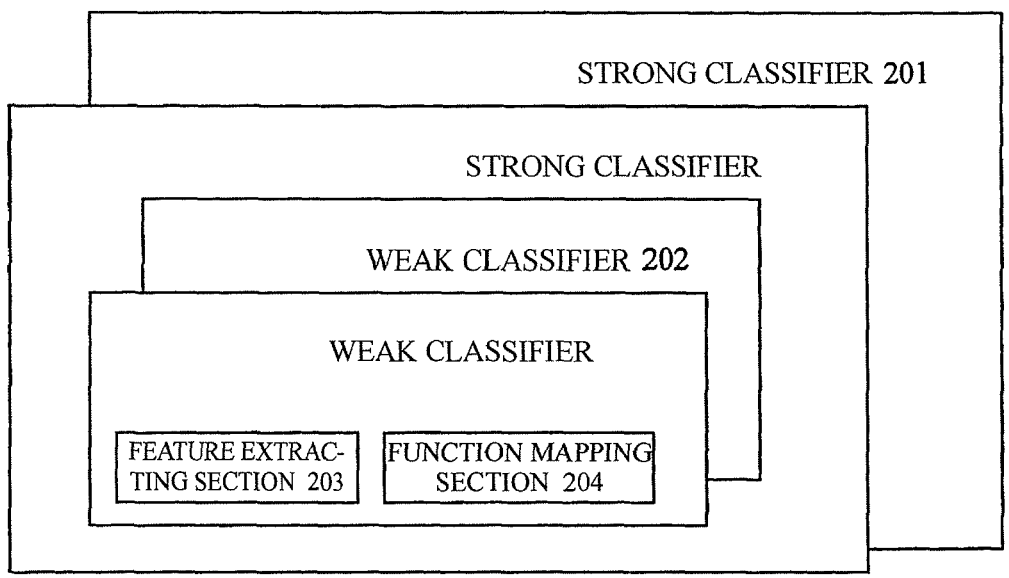

FIG. 1 schematically illustrates a structure employing the object detection apparatus according to the present invention. As shown in FIG. 1, the object detection apparatus of this invention comprises one or more strong classifiers 201 (only two are shown in FIG. 1), each of which comprises one or more weak classifiers 202 (only two are shown in FIG. 1), each of which in turn comprises a feature extracting section 203 and a function mapping section 204. The feature extracting section 203 extracts an feature of an image from which a predetermined object is to be detected, and the function mapping section 204 determines a weak classification of the image in accordance with the feature extracted by the feature extracting section.

Figure 2:
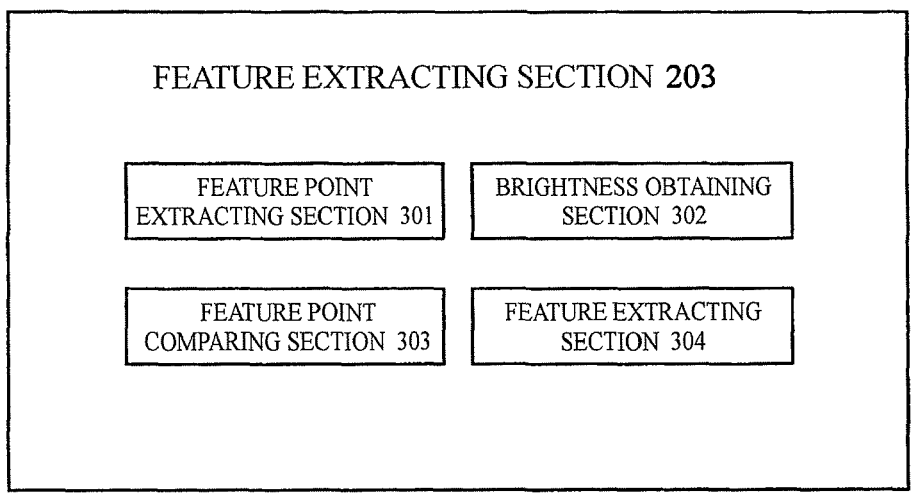
FIG. 2 schematically shows a structure of the feature extracting section according to the present invention.

FIG. 2 schematically shows a structure of the feature extracting section according to the present invention. As shown in FIG. 2, the feature extracting section 203 according to this invention comprises a feature point extracting section 301 for extracting a combination of predetermined feature point pairs from the image, a brightness obtaining section 302 for obtaining brightness of each feature point in the combination of feature point pairs, a feature point comparing section 303 for comparing, in accordance with the brightness obtained by the brightness obtaining section 302, two feature points in each feature point pair to obtain a logical value, and an feature obtaining section 304 for determining the feature of the image in accordance with the logical value.

The feature point extracting section 301 extracts a combination of predetermined feature point pairs from the image.

Figure 3:
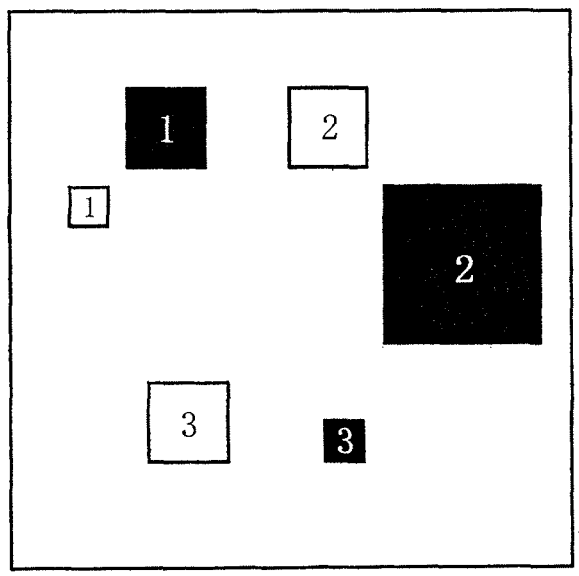
FIG. 3 schematically shows three pairs of feature points as extracted.

Take for example of the three pairs of feature points as shown in FIG. 3, where the dark colored ones are positive points, and the light colored ones are negative points. The positive and negative points are used to determine the comparison sequence of the comparison to be described later, whereby the corresponding positive point is compared with the corresponding negative point (with the same sequence number): the logical value is 1 if larger, and 0 if not (it depends upon agreement whether being zero or 1, and the case can also be contrary to the above).

As should be noted, the feature point here can correspond to one pixel, or a combination of several pixels, for instance, a combination of 4 pixels, or a combination of 16 pixels, etc. Usually, the number of pixels of the combination is an integral power of 4 to correspond to a square image region (for instance, image blocks of 1×1, 2×2, 4×4, 8×8, etc.) referred to as granules. As shown in the drawings, the numbers of pixels of the granules can be different from one another even in the same pair of granules.

The brightness obtaining section 302 obtains brightness of each feature point in the combination of feature point pairs. In the case the feature point is formed by combining a plurality of pixels, the brightness obtaining section 302 obtains the average brightness of the plurality of pixels. For the purpose of illustration, it is assumed hereinbelow that the brightness of the positive points obtained by the brightness obtaining section 302 is respectively 210, 84 and 126, and the brightness of the negative points obtained thereby is respectively 93, 137 and 145.

As should be noted, the present invention is not restricted to obtaining the brightness as discussed above, as it can also make use of other pixel values such as grayscale, brilliance, lightness upon extraction of the edge, etc. Specifically speaking, the pixel values can be such feature quantities as brightness, intensity, angular degree or gradient obtained by extraction of the boundary. For instance, an input image can be changed into a boundary image through a sobel filter, and its intensity, angular degree and gradient are calculated. For instance, the intensity can be calculated via the following expression:

$$G(x,y) = \sqrt{G_x(x,y)^2 + G_y(x,y)^2}$$

The angular degree can be calculated via the following expression:

$$\theta(x, y) = \arctan\left(\frac{G_x(x, y)}{G_y(x, y)}\right)$$

The gradient can be calculated via the following expression:

$$\varphi_k(x, y) = \begin{cases} G(x, y) & \text{if } \theta(x, y) \in \text{bin}_k \\ 0 & \text{else} \end{cases}$$

where $G_x$ is a value calculated by using the following filter (sobel operator):

$$\begin{vmatrix} 1 & 0 & -1 \\ 2 & 0 & -2 \\ 1 & 0 & -1 \end{vmatrix}$$

and $G_y$ is a value calculated by using the following filter:

$$\begin{vmatrix} 1 & 2 & 1 \\ 0 & 0 & 0 \\ -1 & -2 & -1 \end{vmatrix}$$

An element number K can be used to quantize the angular degree. For instance, when K=4, it is represented by four quantized angular ranges of $\text{bin}_0$, $\text{bin}_1$, $\text{bin}_2$, and $\text{bin}_3$, where $\text{bin}_0$ represents a range from 0 degree to 45 degree (0 degree $\leq \text{bin}_0 <$ 45 degree), $\text{bin}_1$, represents a range from 45 degree to 90 degree (45 degree $\leq \text{bin}_1 <$ 90 degree), $\text{bin}_2$ represents a range from 90 degree to 135 degree (90 degree $\leq \text{bin}_2 <$ 135 degree), $\text{bin}_3$ represents a range from 135 degree to 180 degree (135 degree $\leq \text{bin}_3 <$ 180 degree), and so on.

$\text{bin}_k$ can represent any one of the four quantized angular ranges as appropriate.

Alternatively, the element number K can also be used to change the size of the range, for instance, when K=4, $\text{bin}_k$ is a range of 45 degree difference, such as any one of [0 degree, 45 degree), [45 degree, 90 degree), [90 degree, 135 degree), and [135 degree, 180 degree). When K=3, $\text{bin}_k$ is a range of 60 degree difference, such as any one of [0 degree, 60 degree), [60 degree, 120 degree), and [120 degree, 180 degree).

Any feature quantities obtained by prior-art methods other than the above may also serve the purpose. The sobel filter as pointed out above is merely exemplary in nature, as it is also possible to use any methods other than the sobel filter to perform boundary extraction. The brightness obtaining section 302 corresponds to the pixel value obtaining section of this invention.

The feature point comparing section 303 compares, in accordance with the brightness obtained by the brightness obtaining section 302, two feature points in each feature point pair to obtain a logical value.

Three methods can be employed for performing the comparison, and they are respectively referred to as the direct comparison method, the accumulative comparison method and the expanding accumulative comparison method in this invention. The direct comparison method performs direction comparison among feature points, the accumulative comparison method performs accumulative comparison among feature points, and the expanding accumulative comparison method performs accumulative comparison in an expanding manner among feature points. These methods operate in accordance with the following Formulae 1, 2 and 3, respectively.

$$b_i^{(S)} = \text{sign}(g_{i+}(x) - g_{i-}(x)), \quad i = 1, \ldots, n \quad (1)$$

$$b_i^{(C)} = \text{sign}\left(\sum_{s=1}^{i} (g_{s+}(x) - g_{s-}(x))\right), \quad i = 1, \ldots, n \quad (2)$$

$$b_i^{(EC)} = \text{sign}\left(\sum_{s=1}^{i} 2^{s-1}(g_{s+}(x) - g_{s-}(x))\right), \quad i = 1, \ldots, n \quad (3)$$

The function "sign" in the formulae is expressed as follows:

$$\text{sign}(v) = \begin{cases} 1, & \text{if } v \geq 0 \\ 0, & \text{if } v < 0 \end{cases}$$

$b_i^{(S)}$, $b_i^{(C)}$, and $b_i^{(EC)}$ respectively indicate the logical values with regard to the $i^{th}$ pair of granules obtained by the direct comparison method, the accumulative comparison method, and the expanding accumulative comparison method. $g_{i+}$, and $g_{i-}$ respectively indicate the pixel values (such as brightness) of the positive granules and the negative granules in the $i^{th}$ pair of granules.

The feature obtaining section 304 determines the feature of the image in accordance with the logical values obtained by the feature point comparing section 303. Specifically, the logical values can be combined together.

Accordingly, in the case of the brightness as discussed above, when the feature point comparing section 303 employs the direct comparison method, the accumulative comparison method and the expanding accumulative comparison method, respectively, the result Z obtained by the feature obtaining section 304 is as shown below:

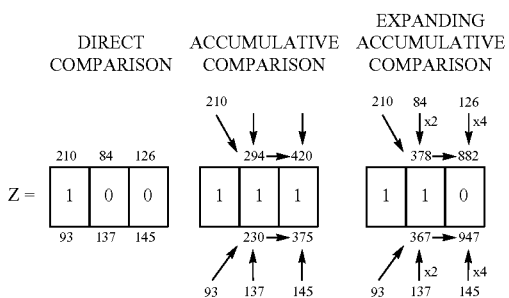

Accordingly, as discussed above, the present invention designs an feature, and concentrates on the logical relationship (also referred to as the relationship of magnitude in this specification) of the magnitudes of the pixel values (such as brightness) between local regions to synthetically judge the exactness of the face in accordance with the logical relationship of the magnitudes of the brightness between plural regions.

If the relationship of magnitude between only 1 pair of regions is taken into consideration (the relationship of magnitude between the respective average brightness of the two regions; the regions appear in pairs like the white frame region and the black frame region in Haar features, but it is not required that the two regions be adjacent to each other), the judgment capability as to whether a face or not is lowered; consequently, judgment should be made uniformly on the basis of the relationship of magnitude among plural pairs of regions.

In FIGS. 4 and 5 the object detection solution of the prior art is compared with the object detection solution according to the present invention. As can be seen from the Figs., in the case the feature shapes are identical, the technical solution of this invention can greatly reduce the computational cost of the feature.

Specifically, in order to perform the detection, it is required in the solution of the prior art:
1. to respectively calculate the difference in brightness between the black frame ■ and the corresponding white frame ☐ (thrice);
2. to total the difference in brightness (once); and
3. to correct the difference in brightness (once).

Insofar as the present invention is concerned and as regards the direct comparison method, it is only necessary to compare the magnitudes of the average brightness of the black frames ■ 1, 2 and 3 and the corresponding white frames ☐ 1, 2 and 3 (thrice).

Figure 12:
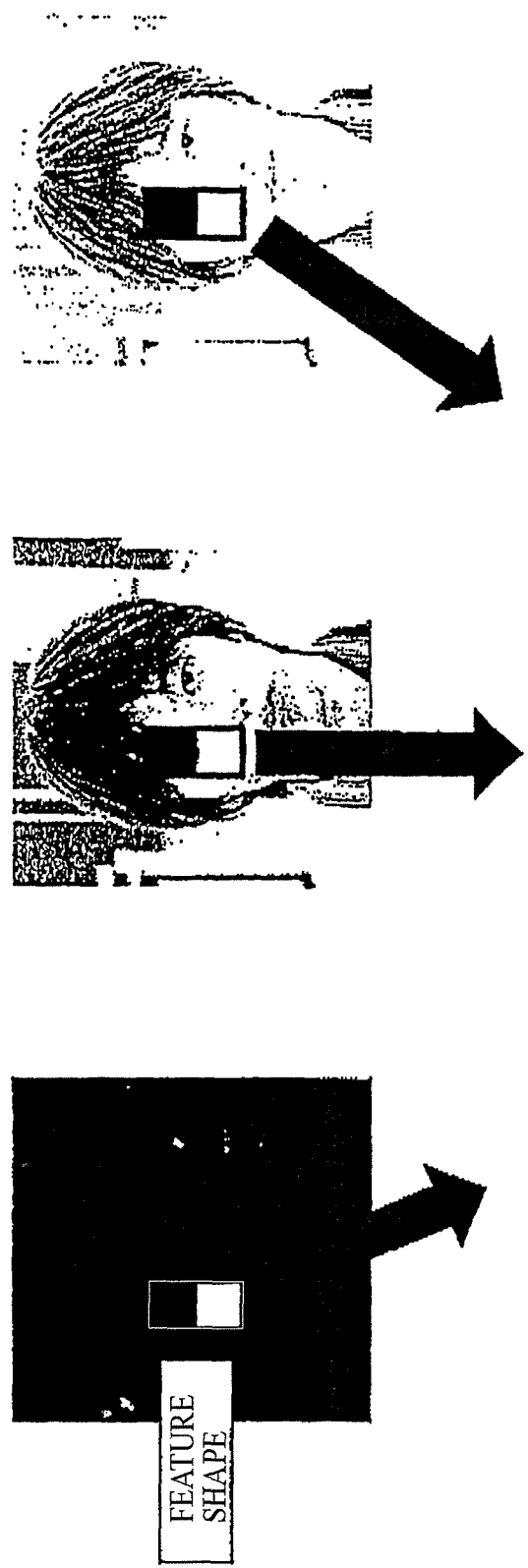
FIG. 12 shows amounts of feature for object detection coming under no influence of illumination variations and requiring no correction calculation according to the present invention.
Figure 13:
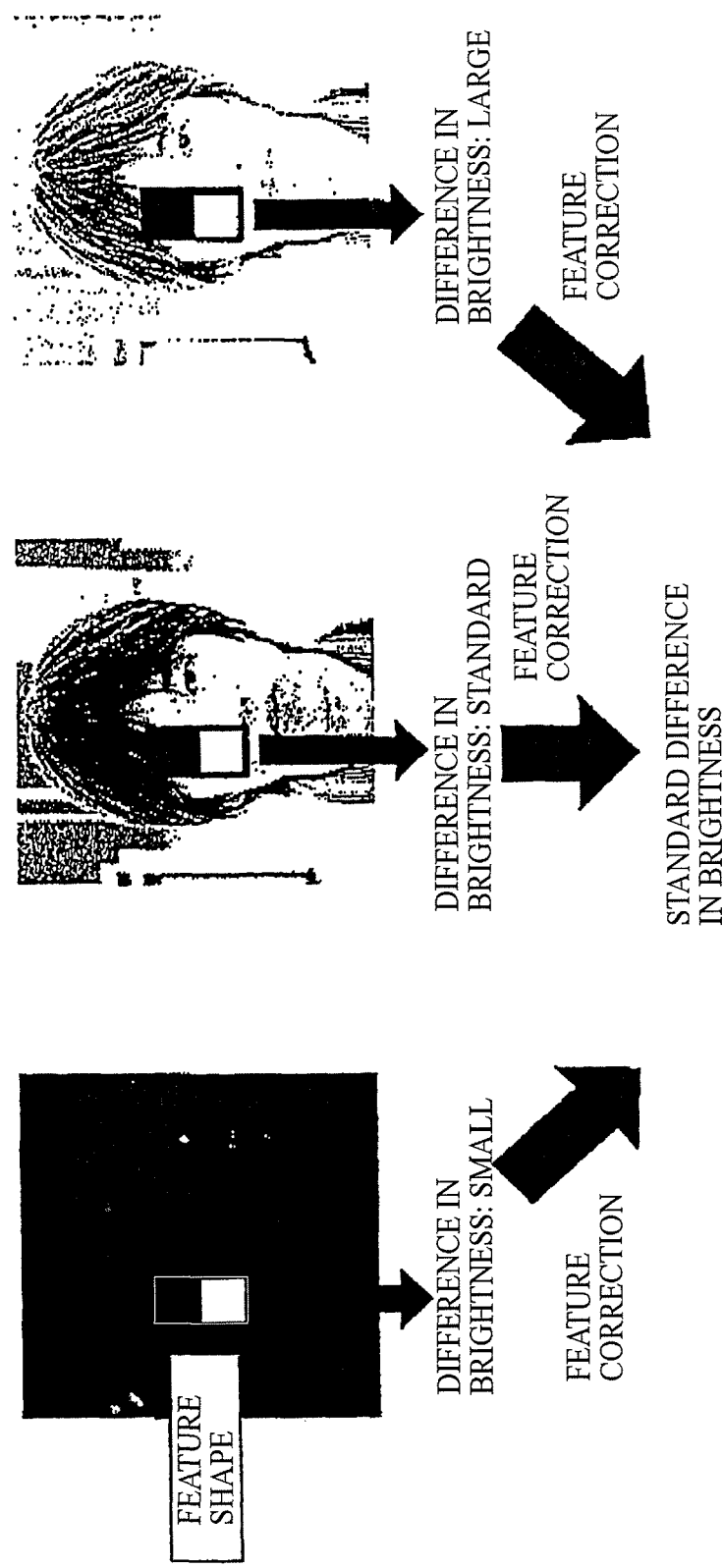
FIG. 13 shows amounts of feature for object detection coming under influence of illumination variations and requiring correction calculation according to the prior art.

Consequently, the present invention rests in the relationship of magnitude (a logical value, namely a binarized 0 or 1) of the lightness and darkness rather than the difference in brightness (differential amount, an integral value) of the face. As can be seen from the above Formulae 1, 2 and 3, no matter which of the direct comparison method, the accumulative comparison method and the expanding accumulative comparison method the feature point comparing section 303 employs, the result Z obtained by the feature obtaining section 304 does not vary with the linear variations of the inputted image, so that, even if the brightness of the face varies, the logical relationship of its magnitude of brightness does not vary, and it is hence unnecessary to correct the feature, thereby greatly reducing the time for calculating the feature. Additionally, multiplication and division are not required in the present invention, thereby making it possible to lower the computational cost, and no integrated image is required for correction of the feature, thereby making it possible to reduce the memory requirement. FIG. 12 shows the stability of the feature according to this invention, as the feature is not affected by external factors such as the influence of illumination, etc., and does not require correction.

The present invention preferably further includes a front processing section. The front processing section generates images suitable for calculation of the feature used in this invention. Corrections such as gamma correction can also be performed in advance on the images to enhance the face detectability. However, the front processing section is optional, and can be dispensed with.

In addition, the present invention can include a search window setting section. The search window setting section determines the windows used for search. On the basis of the inputted image, the search window is used to determine the search image for searching the target object. It is not only possible to fabricate the search image by cutting, but also possible to merely set the position of the search image. The image is scanned to fabricate the search image. Scan is performed at a set size (namely the size of the search window), and the size of the search window is changed to perform scan when scan progresses to the end of the picture. The search window cannot only gradually zoom out according to the image as a whole, but also be gradually zoomed in to the size of the image as a whole from a lesser size. Specifically, as shown in FIG. 5, in the case that the search image has been determined, the feature extracting section extracts the feature of the search image.

The use of the search window having a predetermined size to obtain the search image can reduce the training amount of the object detection apparatus of this invention, lower the storage space and enhance the practicality.

Similarly, this invention can also include an image zooming section that zooms the inputted image to a predetermined size, and the feature extracting section extracts the feature of the zoomed image. This can also reduce the training amount of the object detection apparatus of this invention, lower the storage space and enhance the practicality.

As noted above, the feature point according to this invention can be one pixel or a combination of a plurality of pixels, in which case the brightness obtaining section 302 obtains the average brightness of the plurality of pixels. However, the calculation of the average brightness will decelerate the speed of the object detection. Consequently, it is possible to prepare three kinds of images, one of which is an image shrunk to ½, another one of which is an image shrunk to ¼, and yet another one of which is an image shrunk to ⅛ on the basis of the original image (namely the inputted image).

By using the shrunk images it is possible to process the average pixel value of regions under different rectangular sizes with reference to 1 pixel as described below, so as to achieve high speed.

2×2 region of the original image being 1×1 under an image shrunk to ½

4×4 region of the original image being 1×1 under an image shrunk to ¼

8×8 region of the original image being 1×1 under an image shrunk to ⅛

Figure 11:
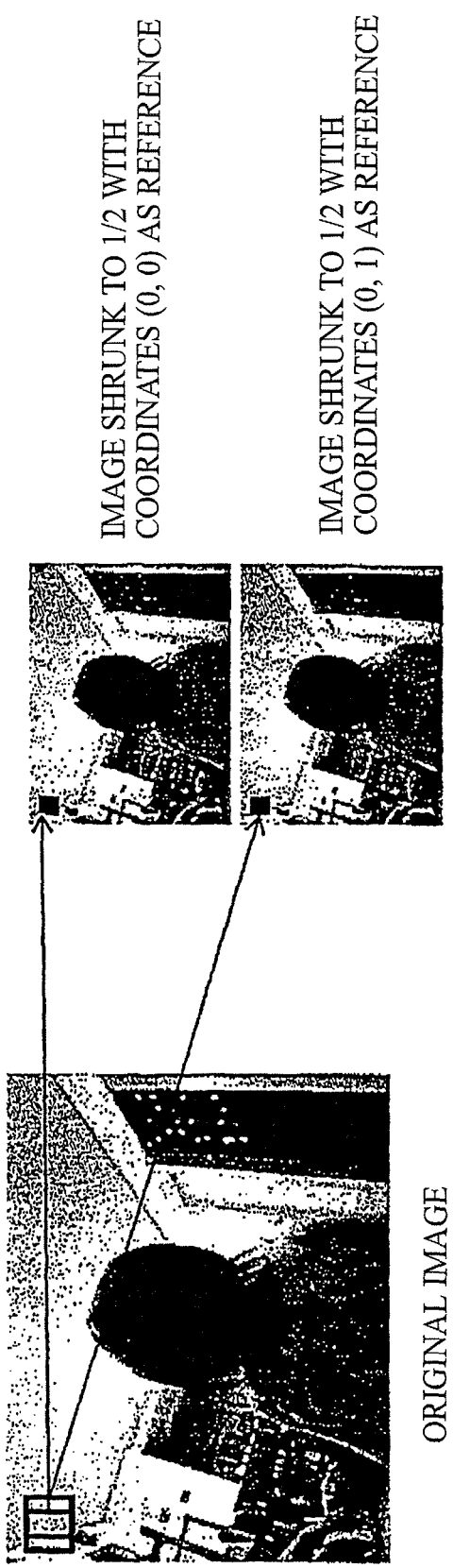
FIG. 11 shows exemplarily displacement fabrications of shrunk images.

During fabrication of the shrunk images, it is possible to fabricate a plurality of shrunk images having the same number as the square of magnification. For instance, 4 images shrunk to ½ can be fabricated, 16 images shrunk to ¼ can be fabricated, and 64 images shrunk to ⅛ can be fabricated. During fabrication of different shrunk images, the starting positions of the shrunk images are fabricated in displacement. It is thus possible to make reference to the average pixel of specific region size with regard to a random position of the original image. This is so because all frames used are square, i.e., 1×1, 2×2, . . . 8×8, the brightness of the pixel on the corresponding position of the shrunk image is the average brightness of the plurality of pixels in the frame, thereby dispensing with the process for calculating the average brightness. FIG. 11 shows exemplarily the displacement fabrication of the shrunk images.

Referring back to FIG. 1, the function mapping section obtains judgment result as the exactness of the face in accordance with feature values (namely bit train values, 8 values from 0 to 7 outputted during comparison of three magnitudes) obtained by the feature obtaining section and in accordance with distribution of the exactness of the object (face) obtained via previous learning. Specifically, when judgment is performed, when a predetermined threshold value is exceeded, it is judged to be a candidate, that is to say, it might be the object (human face). The strong classifier determines whether the candidate is indeed the object (human face) in accordance with the classification results of the one or more weak classifiers included therein. It is possible during the judgment to determine whether the candidate is indeed the object (human face) by combining the classification results (exactness of the face) of the one or more weak classifiers or the feature obtained by each of the weak classifiers.

Figure 6:
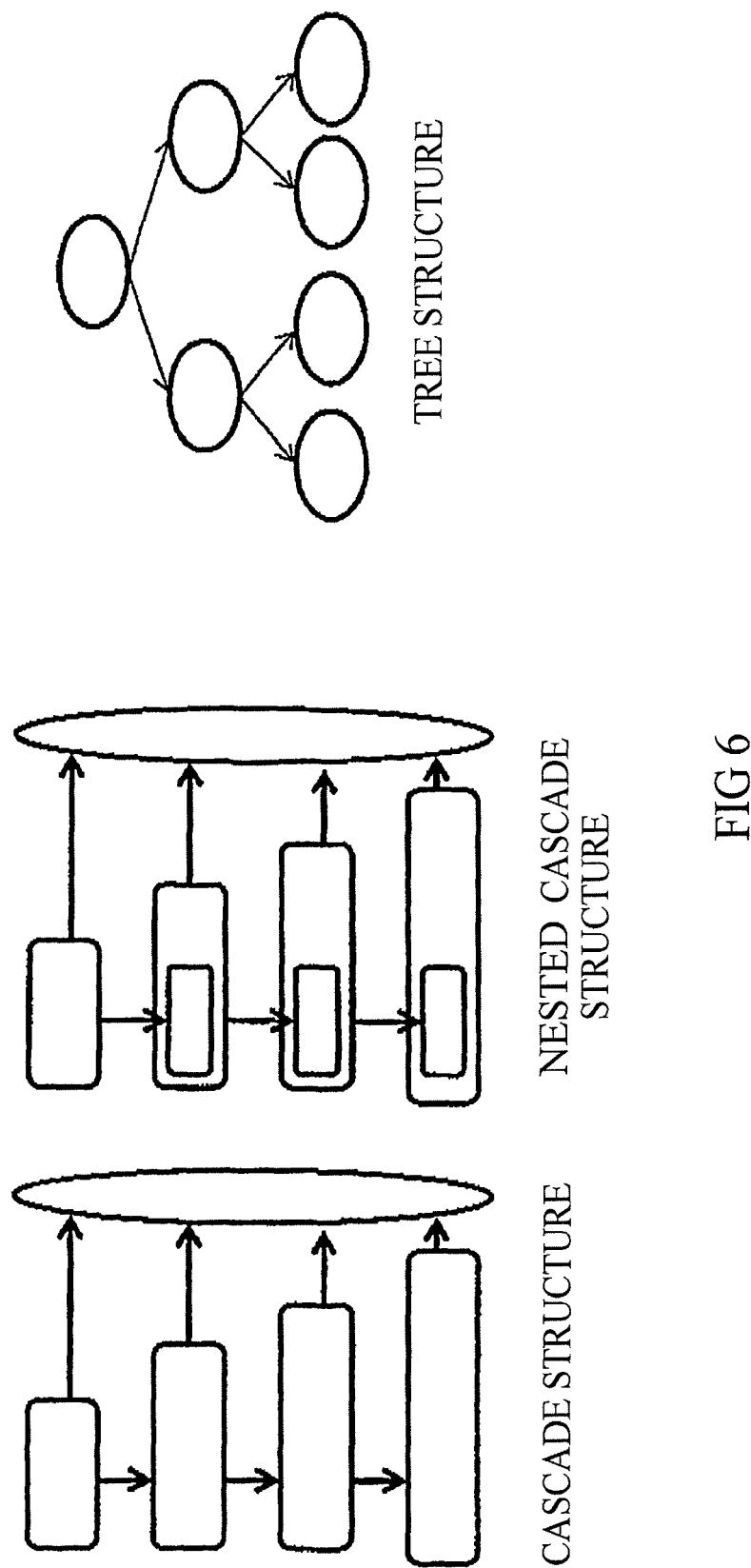
FIG. 6 is a schematically views showing strong classifiers configured as a cascade structure, a nested cascade structure and a tree structure.

For instance as shown in FIG. 6, it is also possible to perform classification by a plurality of strong classifiers. These strong classifiers can be configured as cascade structures, nested cascade structures (a judgment method that the result of a previous layer of structure is transferred to the next layer, in which the result of the previous layer is made use of), or tree structures (whereby plural types are judged, with branches or via a plurality of paths). These structures can identify various angles, orientations and shielding of the object as well as inherent variations of the face, and enhance adaptability and exactness of identification. Specifically, reference can be made to Chinese Patent Application 200610127853.7 as submitted on Sep. 20, 2006, which is incorporated into the present documents by reference.

The regions determined by the determining section to be a face are so processed that the regions whose positions and sizes are slightly displaced with regard to one another are unified as one face.

In addition, the object detection apparatus of this invention further comprises, in one example, a result outputting section for outputting the object detection result, and a storing section for recording classification information obtained via learning.

The learning apparatus of this invention processes as described below.

A plurality of learning samples (correct images, incorrect images) are prepared in advance.

The features used in this invention are fabricated by modeling into a feature database (namely forming granule pairs and sequences formed thereby).

With regard to each learning sample, the feature is obtained by modeling in accordance with the features (in the mode of calculation as discussed above).

A feature mode most capable of judging the correct images and the incorrect images is selected from the feature modes.

Weights of the learning samples are updated seriatim on the basis of the judgment result.

The aforementioned processes are repeated for a constant number of times as the strong classifiers.

Regions erroneously identified by the strong classifiers are extracted from images not including the correct object, and taken as incorrect images when they are collected over a predetermined number.

The aforementioned processes are repeated by using the correct images and new incorrect images to serve as hierarchical structures.

The classifiers obtained via learning are retained in order to perform the detection process.

FIG. 7 shows examples of data structures retained by the storing section.

A detector recorded in a storage is used to determine as to whether a face at a certain position during the search process.

Figure 8:
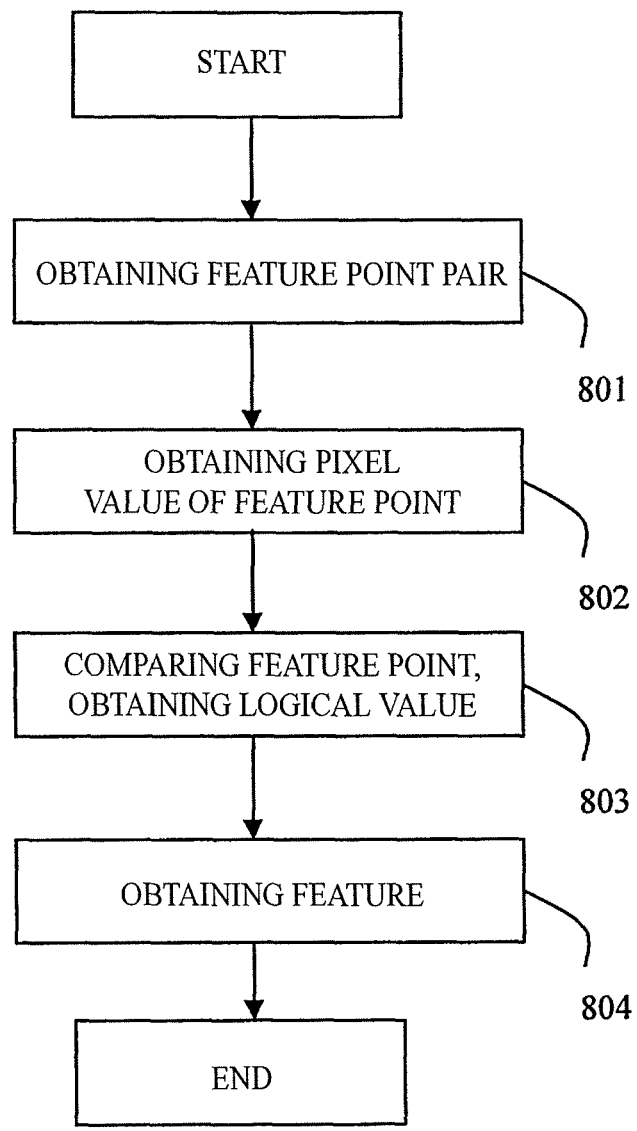
FIG. 8 is a flowchart showing an embodiment of the object detection method according to the present invention.

FIG. 8 is a flowchart showing an embodiment of the object detection method according to the present invention.

As shown in FIG. 8, firstly in step 801, a combination of predetermined feature point pairs is extracted from an image to be detected as to the predetermined object. These feature point pairs can be at predetermined positions of the image. This step is executed, for instance, by the aforementioned feature point extracting section.

Subsequently in step 802, pixel values of the feature points in each of the feature point pairs are calculated. The pixel values can be brightness, for instance. This step is executed, for instance, by the aforementioned brightness obtaining section.

Subsequently in step 803, pixels values of two feature points in each pair are compared to obtain logical values. Such a comparison can be performed through any of the methods as disclosed in any of the aforementioned Formulae 1 to 3. This step is executed, for instance, by the aforementioned feature point comparing section.

Subsequently in step 804, the feature is obtained in accordance with the comparison result. The feature is a combination of the logical values as obtained. This step is executed, for instance, by the aforementioned feature obtaining section.

Figure 9:
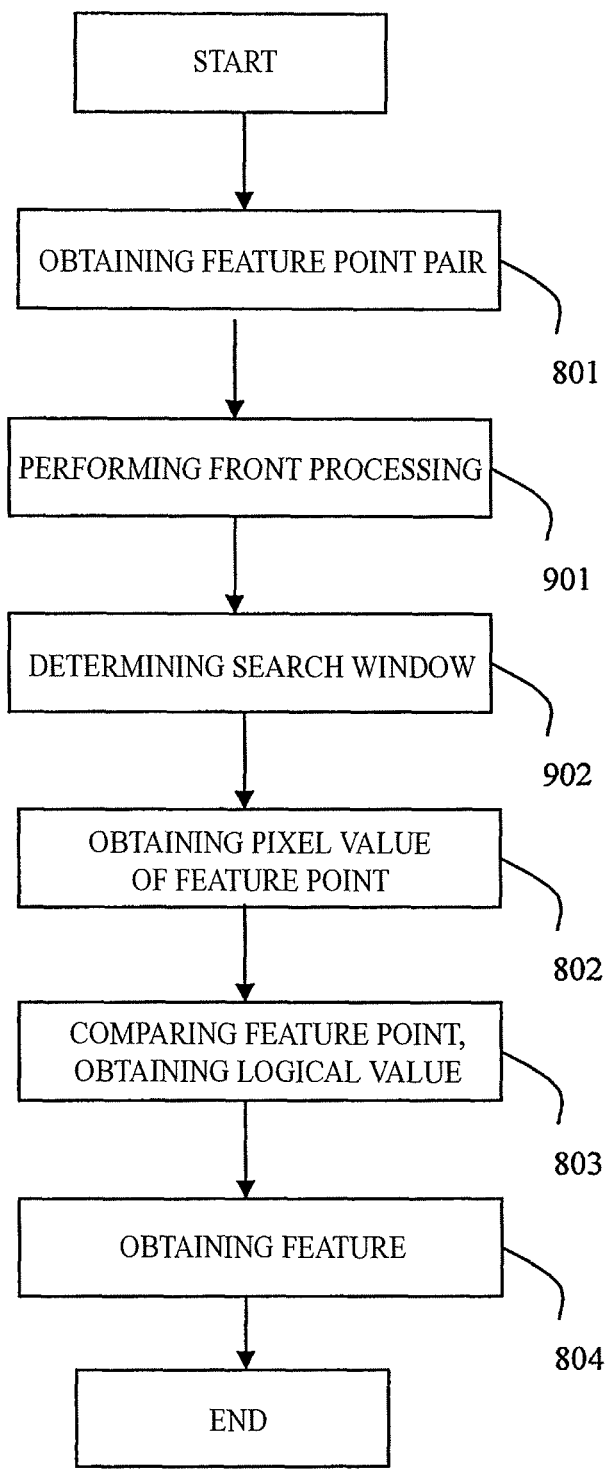
FIG. 9 is a flowchart showing another embodiment of the object detection method according to the present invention.

FIG. 9 is a flowchart showing another embodiment of the object detection method according to the present invention.

As shown in FIG. 9, the object detection method according to another embodiment of the present invention is added a front processing step 901 on the basis of the object detection method as shown in FIG. 8. The front processing step 901 performs front processing on the image to be detected as to the predetermined object to generate the image suitable for calculation of the feature. Corrections such as gamma correction can also be performed on the image in this step to enhance the face detectability.

Additionally, this embodiment of the invention can further include a step 902 for determining the search window. A sub-window that searches the object in the image is determined in this step. The steps for feature point extraction and so on in FIG. 8 are all directed to the image in the portion of this search window.

Figure 10:
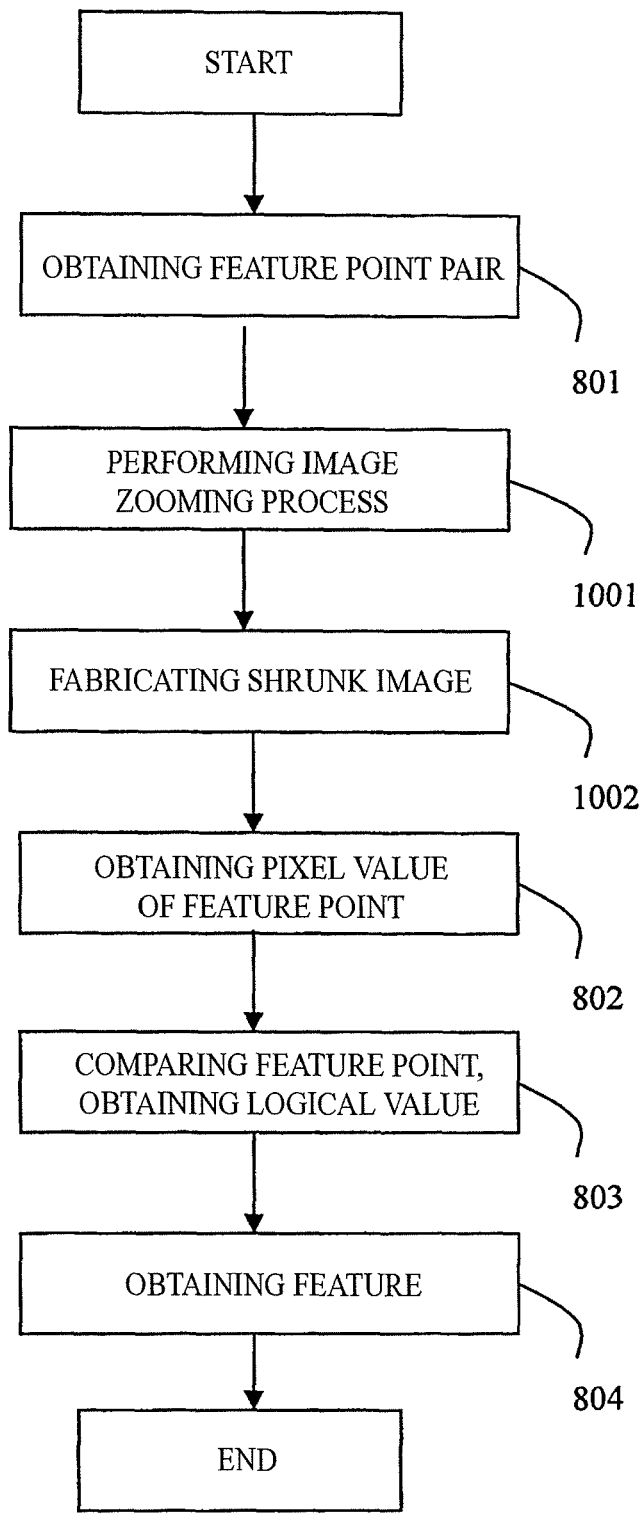
FIG. 10 is a flowchart showing still another embodiment of the object detection method according to the present invention.

FIG. 10 is a flowchart showing still another embodiment of the object detection method according to the present invention.

As shown in FIG. 10, the object detection method according to still another embodiment of the present invention is added a step 1001 for zooming the image on the basis of the object detection method as shown in FIG. 8. In step 1001 the image to be detected as to the predetermined object is zoomed to a predetermined size, and the subsequent steps are directed to the zoomed image. This can reduce the training amount of the object detection apparatus of this invention (as the training can be performed merely with regard to the predetermined image size), reduce the storage space and enhance the practicality.

In addition, this embodiment of the invention can further include a step for fabricating shrunk images. As noted above, it is thus possible to make reference to the average pixel of specific region size with regard to a random position of the original image, thereby dispensing with the process of calculating the average pixel value (brightness).

As should be aware to a person ordinarily skilled in the art, the aforementioned embodiments and examples of the present invention are merely exemplary in nature. The sequences of the aforementioned method steps can be adjusted upon practical circumstances, can be executed in parallel, and can be performed on different devices as well as on the same device.

As should also be aware to a person ordinarily skilled in the art, the aforementioned apparatus and method can be implemented in specific hardware, or via a computer executing a specific computer program or a logical device. The computer program enables the computer or the logical device to carry out the aforementioned method or each of the steps of the method, or enables the computer or the logical device to operate as the aforementioned apparatus or a component part of the apparatus. The computer program and the computer readable storage medium storing the computer program are also within the protection scope of the present invention. The computer readable storage medium can be any storage media utilizing magnetic, electrical and optical technologies or any combination thereof, such as a CD, a VCD, a DVD, a magnetic disk, an MO, a flash memory or a tape etc. that are conceivable to the person skilled in the art.

Although the present invention is described with the help of the aforementioned embodiments, the scope of the present invention is not restricted thereto. The scope of the present invention is determined by the claims and their analogues.

The invention claimed is:

1. An object detection apparatus for detecting a predetermined object from an image, comprising one or more strong classifiers each including one or more weak classifiers each including a feature extracting section and a function mapping section, of which the feature extracting section extracts a feature of the image, and the function mapping section determines a weak classification of the image in accordance with the feature extracted by the feature extracting section; wherein the feature extracting section comprises:
   a feature point extracting section, for extracting a combination of predetermined feature point pairs from the image;
   a pixel value obtaining section, for obtaining a pixel value of each feature point in the combination of feature point pairs;
   a feature point comparing section, for comparing, in accordance with the pixel values obtained by the pixel value obtaining section, two feature points in each feature point pair to obtain a logical value; and
   a feature obtaining section, for determining the feature of the image in accordance with the logical value,
   wherein the feature point comparing section obtains the logical value $b_i$ for an i-th feature point pair using any one of the following formulae:

$$b_i = \mathrm{sign}\left(\sum_{s=1}^{i}(g_{s1} - g_{s2})\right)$$

$$b_i = \mathrm{sign}\left(\sum_{s=1}^{i} 2^{s-1}(g_{s1} - g_{s2})\right)$$

where $g_{s1}$ and $g_{s2}$ represent pixel values of two feature points in s-th feature point pair, respectively, and
the function sign( ) is defined as follows:

$$\mathrm{sign}(v) = \begin{cases} 1, & \text{if } v \geq 0 \\ 0, & \text{if } v < 0 \end{cases}.$$

2. The object detection apparatus as claimed in claim 1, wherein the pixel value is brightness.

3. The object detection apparatus as claimed in claim 1, wherein the pixel value is intensity, angular degree, or gradient obtained by extraction of a boundary.

4. The object detection apparatus as claimed in claim 1, further comprising a front processing section for processing the image to generate the image suitable for calculation of the feature.

5. The object detection apparatus as claimed in claim 1, further comprising a search window determining section for determining a sub-window which is used for searching the object in the image, wherein the feature extracting section extracts the feature of the part of the image in the sub-window.

6. The object detection apparatus as claimed in claim 1, further comprising an image zooming section for zooming the image, wherein the feature extracting section extracts the feature of the zoomed image.

7. The object detection apparatus as claimed in claim 1, wherein the feature point comprises a plurality of pixel points, wherein the pixel value obtaining section calculates an average pixel value of the plurality of pixel points as the pixel value of the feature point.

8. The object detection apparatus as claimed in claim 1, wherein the feature point comprises a plurality of pixel points, and the object detection apparatus comprises a shrunk image fabricating section for shrinking the image in accordance with the number of the pixel points included in the feature point, wherein the feature extracting section extracts the feature of the shrunk image.

9. An object detection apparatus for detecting a predetermined object from an image, comprising one or more strong classifiers each including one or more weak classifiers each including a feature extracting section and a function mapping section, of which the feature extracting section extracts a feature of the image, and the function mapping section determines a weak classification of the image in accordance with the feature extracted by the feature extracting section; characterized in that the feature extracting section comprises:
   a feature point extracting section, for extracting a combination of predetermined feature point from the image;
   a pixel value obtaining section, for obtaining a pixel value of each feature point in the combination of feature point pairs;
   a feature point comparing section, for comparing, in accordance with the pixel values obtained by the pixel value obtaining section, two feature points in each feature point pair to obtain a logical value; and
   a feature obtaining section, for determining the feature of the image in accordance with the logical value, wherein the feature point comprises a plurality of pixel points, and that the object detection apparatus comprises a shrunk image fabricating section for shrinking the image in accordance with the number of the pixel points included in the feature point, wherein the feature extracting section extracts the feature of the shrunk image, and wherein the shrunk image fabricating section fabricates shrunk images having the same number as the number of a squared magnification, and the feature extracting section extracts the feature of the shrunk image of a proper position.

10. The object detection apparatus as claimed in claim 1, further comprising a plurality of strong classifiers configured as one of a cascade structure, an imbedded cascade structure and a tree structure.

11. The object detection apparatus as claimed in claim 1, wherein the object is a human body, a specific animal, a vehicle or a human face.

12. An object detection method, comprising one or more strongly classifying steps each including one or more weakly classifying steps each including a feature extracting step and a function mapping step, of which the feature extracting step extracts a feature of an image to be detected, and the function mapping step determines a weak classification of the image in accordance with the feature extracted by the feature extracting step; wherein the feature extracting step comprises:

a feature point extracting step, for extracting a combination of predetermined feature point pairs from the image;

a pixel value obtaining step, for obtaining a pixel value of each feature point in the combination of feature point pairs;

a feature point comparing step, for comparing, in accordance with the pixel values obtained by the pixel value obtaining step, two feature points in each feature point pair to obtain a logical value; and a feature obtaining step, for determining the feature of the image in accordance with the logical value, wherein the feature point comparing step further comprises obtaining the logical value $b_i$ for an i-th feature point pair using any one of the following formulae:

$$b_i = \text{sign}\left(\sum_{s=1}^{i} (g_{s1} - g_{s2})\right)$$

$$b_i = \text{sign}\left(\sum_{s=1}^{i} 2^{s-1}(g_{s1} - g_{s2})\right)$$

where $g_{s1}$ and $g_{s2}$ represent pixel values of two feature points in s-th feature point pair, respectively, and the function sign( ) is defined as follows:

$$\text{sign}(v) = \begin{cases} 1, & \text{if } v \geq 0 \\ 0, & \text{if } v < 0 \end{cases}.$$

* * * * *

UNITED STATES PATENT AND TRADEMARK OFFICE
CERTIFICATE OF CORRECTION

PATENT NO.       : 8,520,955 B2  
APPLICATION NO. : 12/810449  
DATED            : August 27, 2013  
INVENTOR(S)      : Ai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 587 days.

Signed and Sealed this

Fifteenth Day of September, 2015

Michelle K. Lee
*Director of the United States Patent and Trademark Office*